United States Patent
Ithal et al.

(10) Patent No.: US 10,986,150 B2
(45) Date of Patent: Apr. 20, 2021

(54) LOAD BALANCING IN A DYNAMIC SCALABLE SERVICES MESH

(71) Applicant: Netskope, Inc., Santa Clara, CA (US)

(72) Inventors: Ravi Ithal, Los Altos, CA (US); Umesh Bangalore Muniyappa, Bangalore (IN)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 16/807,128

(22) Filed: Mar. 2, 2020

(65) Prior Publication Data
US 2020/0280448 A1  Sep. 3, 2020

Related U.S. Application Data

(60) Provisional application No. 62/812,760, filed on Mar. 1, 2019, provisional application No. 62/812,791, filed on Mar. 1, 2019.

(51) Int. Cl.
| | |
|---|---|
| *H04L 9/00* | (2006.01) |
| *H04L 29/06* | (2006.01) |
| *H04L 29/12* | (2006.01) |
| *H04L 12/26* | (2006.01) |
| *H04L 9/32* | (2006.01) |

(Continued)

(52) U.S. Cl.
CPC ........ *H04L 65/4092* (2013.01); *H04L 9/3242* (2013.01); *H04L 43/0876* (2013.01); *H04L 45/7453* (2013.01); *H04L 61/2503* (2013.01); *H04L 65/80* (2013.01);

(Continued)

(58) Field of Classification Search
USPC ....................................................... 713/170
See application file for complete search history.

(56) References Cited

U.S. PATENT DOCUMENTS 9,363,180 B2 * 6/2016 Beliveau ............... H04L 45/745
10,270,711 B2 * 4/2019 Chen ..................... G06F 9/5083
(Continued)

OTHER PUBLICATIONS

U.S. Appl. No. 16/807,132, filed Mar. 2, 2020, US-2020-0280592-A1, Sep. 3, 2020, Pending.

(Continued)

*Primary Examiner* — Christopher J Brown
(74) *Attorney, Agent, or Firm* — Haynes Beffel & Wolfeld, LLP; Ernest J. Beffel, Jr.

(57) ABSTRACT

The disclosed technology teaches distributed routing and load balancing in a dynamic service chain: receiving and processing a packet, with added header including stream affinity code, at a first service instance and based on processing determining a second service, among available services, that should next handle the packet. The technology teaches accessing a flow table using the stream affinity code in the header to select a service instance performing the second service in the service chain, and routing the packet to the second service instance upon egress from the first service instance. When the flow table lacks an entry for the second service corresponding to the stream affinity code, the disclosed technology teaches accessing a consistent hash table of service instances performing the second service, selecting an available instance, and updating the flow table to specify the second service instance as providing the second service for packets sharing the header.

20 Claims, 10 Drawing Sheets

(51) Int. Cl.
*H04L 12/743* (2013.01)
*H04L 29/08* (2006.01)
(52) U.S. Cl.
CPC .......... *H04L 67/1002* (2013.01); *H04L 69/16* (2013.01); *H04L 69/22* (2013.01)

(56) References Cited

U.S. PATENT DOCUMENTS

| | | | | |
|---|---|---|---|---|
| 10,333,846 | B2* | 6/2019 | Singhal | H04L 45/7453 |
| 10,452,422 | B2* | 10/2019 | Lou | H04L 41/5054 |
| 10,616,321 | B2* | 4/2020 | Abhigyan | H04L 45/7453 |
| 2017/0013028 | A1 | 1/2017 | Yang et al. | |
| 2018/0115586 | A1 | 4/2018 | Chou et al. | |
| 2019/0373305 | A1 | 12/2019 | Yang et al. | |
| 2020/0036717 | A1* | 1/2020 | Akella | H04L 12/4633 |

OTHER PUBLICATIONS

"Data Loss Prevention and Monitoring in the Cloud" by netSkope, Inc., Nov. 2014, 18 pgs.
"Netskope Active Cloud DLP," netSkope, Inc., 2015, 4 pgs.
"Repave the Cloud-Data Breach Collision Course," netSkope, Inc., 2014, 6 pgs.
"The 5 Steps to Cloud Confidence," netSkope, Inc., 2014, 11 pgs.
"Netskope Cloud Confidence Index™," netSkope, Inc., 2015, 2 pgs.
"Netskope Introspection," netSkope, Inc., 2015, 3 pgs.
Cheng et al., "Cloud Security for Dummies, Netskope Special Edition," John Wiley & Sons, Inc. 2015.
Eisenbud et al., "Maglev: A Fast and Reliable Software Network Load Balancer", Google Inc., UCLA SpaceX, maglev-nsdi@google.com, Feb. 2016, 13 pages.
"Cloud Data Loss Prevention Reference Architecture", Sep. 2015, Netskope, WP-88-1, 2 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Netskope The 15 Critical CASB Use Cases", Netskope, Inc., EB-141-1, 19 pages.
Halpern, et al, RFC 7664, "Service Function Chaining (SFC) Architecture", Internet Engineering Task Force (IETF), Cisco, ISSN: 2070-1721, Oct. 2015, 64 pages.
Quinn, et al—RFC 8300, "Network Service Header (NSH)", Internet Engineering Task Force (IETF), ISSN: 2070-1721, Jan. 2018, 80 pages.
U.S. Appl. No. 16/807,132—Notice of Allowance dated Aug. 12, 2020, 16 pages.

* cited by examiner

LOAD BALANCING IN A DYNAMIC SCALABLE SERVICES MESH

PRIORITY DATA

This application claims the benefit of U.S. Patent Application No. 62/812,760, entitled "LOAD BALANCING IN A DYNAMIC SCALABLE SERVICES MESH," filed on Mar. 1, 2019 and U.S. Provisional Patent Application No. 62/812,791 entitled "RECOVERY FROM FAILURE IN A DYNAMIC SCALABLE SERVICES MESH," filed on Mar. 1, 2019. The provisional applications are incorporated by reference for all purposes.

INCORPORATIONS

The following materials are incorporated by reference in this filing:

US Non-Provisional patent application entitled "RECOVERY FROM FAILURE IN A DYNAMIC SCALABLE SERVICES MESH," by Ravi ITHAL and Umesh Muniyappa (Ser. No. 16/807,132) filed contemporane U.S. Non Provisional application Ser. No. 14/198,508, entitled "SECURITY FOR NETWORK DELIVERED SERVICES", filed on Mar. 5, 2014 (now U.S. Pat. No. 9,270,765, issued Feb. 23, 2016), U.S. Non Provisional application Ser. No. 14/198,499, entitled "SECURITY FOR NETWORK DELIVERED SERVICES", filed Mar. 5, 2014 (now U.S. Pat. No. 9,398,102, issued on Jul. 19, 2016), U.S. Non Provisional application Ser. No. 14/835,640, entitled "SYSTEMS AND METHODS OF MONITORING AND CONTROLLING ENTERPRISE INFORMATION STORED ON A CLOUD COMPUTING SERVICE (CCS)", filed on Aug. 25, 2015 (now U.S. Pat. No. 9,928,377, issued on Mar. 27, 2018), U.S. Non Provisional application Ser. No. 15/368,246, entitled "MIDDLE WARE SECURITY LAYER FOR CLOUD COMPUTING SERVICES", filed on Dec. 2, 2016, which claims the benefit of U.S. Provisional Application No. 62/307,305, entitled "SYSTEMS AND METHODS OF ENFORCING MULTI-PART POLICIES ON DATA-DEFICIENT TRANSACTIONS OF CLOUD COMPUTING SERVICES", filed on Mar. 11, 2016, "Cloud Security for Dummies, Netskope Special Edition" by Cheng, Ithal, Narayanaswamy, and Malmskog, John Wiley & Sons, Inc. 2015, "Netskope Introspection" by Netskope, Inc., "Data Loss Prevention and Monitoring in the Cloud" by Netskope, Inc., "Cloud Data Loss Prevention Reference Architecture" by Netskope, Inc., "The 5 Steps to Cloud Confidence" by Netskope, Inc., "The Netskope Active Platform" by Netskope, Inc.

"The Netskope Advantage: Three "Must-Have" Requirements for Cloud Access Security Brokers" by Netskope, Inc., "The 15 Critical CASB Use Cases" by Netskope, Inc.

"Netskope Active Cloud DLP" by Netskope, Inc.,

"Repave the Cloud-Data Breach Collision Course" by Netskope, Inc.; and

"Netskope Cloud Confidence Index™" by Netskope, Inc. which are incorporated by reference for all purposes as if fully set forth herein.

FIELD OF THE TECHNOLOGY DISCLOSED

The technology disclosed relates generally to security for network delivered services, and in particular relates to load balancing in a dynamic service chain with a cloud access security broker (CASB), for reducing latency and increasing availability and scalability in flexibly configurable data paths through service chains while applying security services in the cloud.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The use of cloud services for corporate functionality is common. According to International Data Corporation, almost half of all information technology (IT) spending will be cloud-based in 2018, "reaching 60% of all IT infrastructure and 60-70% of all software, services and technology spending by 2020." For example, enterprise companies often utilize software as a service (SaaS) solutions instead of installing servers within the corporate network to deliver services.

Data is the lifeblood of many businesses and must be effectively managed and protected. With the increased adoption of cloud services, companies of all sizes are relying on the cloud to create, edit and store data. This presents new challenges as users access cloud services from multiple devices and share data, including with people outside of an organization. It is easy for data to get out of an organization's control.

Customers want to be able to securely send all of their data between customer branches and data centers. *All* data includes peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype; Internet traffic, cloud application data, and generic routing encapsulation (GRE) data. As an example of the size of the P2P file sharing segment of data that needs to be handled securely, BitTorrent, one common protocol for transferring large files such as digital video files containing TV shows or video clips or digital audio files containing songs, had 15-27 million concurrent users at any time and was utilized by 150 million active users as of 2013. Based on these figures, the total number of monthly BitTorrent users was estimated at more than a quarter of a billion, with BitTorrent responsible for 3.35% of worldwide bandwidth, more than half of the 6% of total bandwidth dedicated to file sharing.

As the number of data sources increases, there are hundreds of ways data can be compromised. Employees might send a wrong file, not be careful when rushing to a deadline, or share data and collaborate with people outside of their organization. The native cloud storage sync clients also pose a significant risk to organizations. A continuous sync takes place between the end point and the cloud service without employees realizing they may be leaking confidential company information. In one use case, companies may want to allow employees and contractors to make voice calls and participate in video conferences, while not enabling them to transfer files over LTE via SIP and Skype. In another example, an enterprise may want to enable their users to view videos and not be able to upload or download video content files.

Accordingly, it is vital to facilitate the use of cloud services so people can continue to be productive and use the best tools for the job without compromising sensitive information such as intellectual property, non-public financials, strategic plans, customer lists, personally identifiable information belonging to customers or employees, and the like.

An opportunity arises to apply security services to all customer traffic while reducing latency and increasing availability and scalability in flexibly configurable data paths in a services mesh through service chains, expanding beyond cloud apps and web traffic firewalls to securely process P2P traffic over BT, FTP and UDP-based streaming protocols as well as Skype, voice, video and messaging multimedia communication sessions over SIP and web traffic over other protocols.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1A:
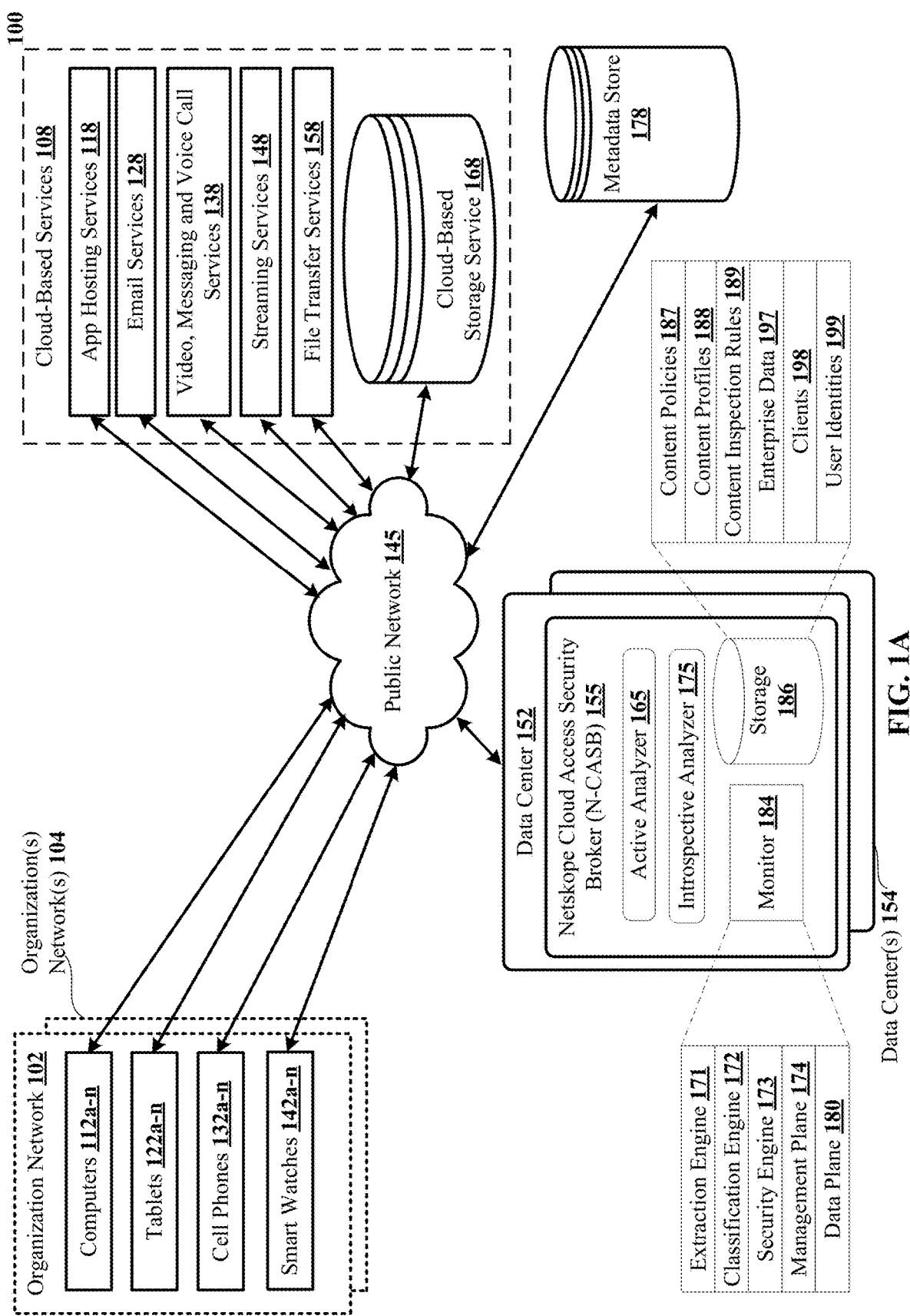
FIG. 1A illustrates an architectural level schematic of a system for load balancing in a dynamic service chain, including reducing latency and increasing availability and scalability in flexibly configurable data paths through service chains while applying security services in the cloud.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Existing approaches for applying security services to customer traffic include a security device point of presence (PoP) in the path of data flow between customer branches of organization networks and data centers accessed in the cloud via the Internet.

Organizations want to utilize a single security service that can apply security services to all customer traffic, expanding beyond cloud apps and web traffic firewalls to securely process P2P traffic over BT, FTP and UDP-based streaming protocols as well as Skype, voice, video and messaging multimedia communication sessions over SIP, and web traffic over other protocols. In one example, the security service needs to allow employees and contractors at an organization to make calls, but not transfer files, a policy that the service can enforce by encoding a SIP control channel and data channel. The enforcement of this policy necessitates more than a SIP proxy to enable the ability to anticipate where the data is getting transferred, and the ability to either avoid or block that channel, based on information in the channel. A streaming agent sending traffic looks at the port only, so needs to know all available ports before sending. If handling all protocols, the security service can catch web traffic over non-standard ports, but it is hard to gather the traffic. An existing workaround for securing files from being transferred is to block access to ports, but security services want to load everything, safely—not block ports. P2P data packets try standard ports first, and then often fall back, hopping from port to port, which also limits the usefulness of blocking a port, because the P2P data service can hop to a different port.

Security administrators can install security service devices in each of the customer branches of organization networks, in data centers and headquarters, to create a management network for applying security policies, so that all traffic goes through security devices. On-premise security administrators would then be responsible for managing deployment to ensure high availability of devices with failover management, managing software life cycles with patches, and administering upgrades to respond to hardware life cycles. Issues for this hands-on approach to security include scaling when company size changes and load balancing for ensuring adequate service availability as data loads vary.

The disclosed technology for load balancing in a dynamic service chain offers a security services platform that scales horizontally and uniformly to administer customized security services and policies for organizations and avoids single points of failure. Security services customers using the disclosed technology are able to specify which security services apply for different types of tenant data, and to customize security policies for the data being transmitted via the devices of their organizations. Tenant configurations can be documented using a service chain to specify the path for the flow of data packets that are to be sequentially routed to multiple security services for the specific tenant. The tenant configuration specifies the ordered sequence of services in a service chain for the customer. The subsequent dynamic steering of traffic flows of data packets through the ordered set of services needs to be fast to provide acceptable security services for tenants. Also, new third party services can be deployed using the security services platform, without affecting existing flows of packets. Additional disclosed technology for improved recovery from failure of a service instance in a service chain identifies primary and secondary roles for service instances and synchronizes state information when processing packets, to improve recovery from failure of service instances. An example system for load balancing of a dynamic service chain is described next.

Architecture

FIG. 1A shows an architectural level schematic of a system 100 for load balancing in a dynamic service chain, and for reducing latency and increasing availability and scalability in flexibly configurable data paths through service chains while applying security services in the cloud. Because FIG. 1A is an architectural diagram, certain details are intentionally omitted to improve clarity of the description. The discussion of FIG. 1A will be organized as follows. First, the elements of the figure will be described, followed by their interconnections. Then, the use of the elements in the system will be described in greater detail.

System 100 includes organization network 102, data center 152 with Netskope cloud access security broker (N-CASB) 155 and cloud-based services 108. System 100 includes multiple organization networks 104 for multiple subscribers, also referred to as multi-tenant networks, of a security services provider and multiple data centers 154, which are sometimes referred to as branches. Organization network 102 includes computers 112a-n, tablets 122a-n, cell phones 132a-n and smart watches 142a-n. In another organization network, organization users may utilize additional devices. Cloud services 108 includes cloud-based hosting services 118, web email services 128, video, messaging and voice call services 138, streaming services 148, file transfer services 158, and cloud-based storage service 168. Data center 152 connects to organization network 102 and cloud-based services 108 via public network 145.

Continuing with the description of FIG. 1A, disclosed enhanced Netskope cloud access security broker (N-CASB) 155 securely processes P2P traffic over BT, FTP and UDP-based streaming protocols as well as Skype, voice, video and messaging multimedia communication sessions over SIP, and web traffic over other protocols, in addition to governing access and activities in sanctioned and unsanctioned cloud apps, securing sensitive data and preventing its loss, and protecting against internal and external threats. N-CASB 155 includes active analyzer 165 and introspective analyzer 175 that identify the users of the system and set policies for apps. Introspective analyzer 175 interacts directly with cloud-based services 108 for inspecting data at rest. In a polling mode, introspective analyzer 175 calls the cloud-based services using API connectors to crawl data resident in the cloud-based services and check for changes. As an example, Box™ storage application provides an admin API called the Box Content API™ that provides visibility into an organization's accounts for all users, including audit logs of Box folders, that can be inspected to determine whether any sensitive files were downloaded after a particular date, at which the credentials were compromised. Introspective analyzer 175 polls this API to discover any changes made to any of the accounts. If changes are discovered, the Box Events API™ is polled to discover the detailed data changes. In a callback model, introspective analyzer 175 registers with the cloud-based services via API connectors to be informed of any significant events. For example, introspective analyzer 175 can use Microsoft Office365 Webhooks API™ to learn when a file has been shared externally. Introspective analyzer 175 also has deep API inspection (DAPII), deep packet inspection (DPI), and log inspection capabilities and includes a DLP engine that applies the different content inspection techniques on files at rest in the cloud-based services, to determine which documents and files are sensitive, based on policies and rules stored in storage 186. The result of the inspection by introspective analyzer 175 is generation of user-by-user data and file-by-file data.

Continuing further with the description of FIG. 1A, N-CASB 155 further includes monitor 184 that includes extraction engine 171, classification engine 172, security engine 173, management plane 174 and data plane 180. Also included in N-CASB 155, storage 186 includes content policies 187, content profiles 188, content inspection rules 189, enterprise data 197, information for clients 198 and user identities 199. Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any other text-based document. User identity refers to an indicator that is provided by the network security system to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or userid corporate identity directory, but is distinct from it. In one implementation, a cryptographic certificate signed by the network security is used as the user identity. In other implementations, the user identity can be solely unique to the user and be identical across devices.

Embodiments can also interoperate with single sign-on (SSO) solutions and/or corporate identity directories, e.g. Microsoft's Active Directory. Such embodiments may allow policies to be defined in the directory, e.g. either at the group or user level, using custom attributes. Hosted services configured with the system are also configured to require traffic via the system. This can be done through setting IP range restrictions in the hosted service to the IP range of the system and/or integration between the system and SSO systems. For example, integration with a SSO solution can enforce client presence requirements before authorizing the sign-on. Other embodiments may use "proxy accounts" with the SaaS vendor—e.g. a dedicated account held by the system that holds the only credentials to sign in to the service. In other embodiments, the client may encrypt the sign on credentials before passing the login to the hosted service, meaning that the networking security system "owns" the password.

Storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud services 108. Non-structured data, such as free text, can also be provided by, and targeted back to cloud services 108. Both structured and non-structured data are capable of being aggregated by introspective analyzer 175. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store 148 like Apache Cassandra™ 158, Google's BigTable™, HBase™ Voldemort™, CouchDB™, MongoDB™, Redis™, Riak™, Neo4j™, etc., which stores the parsed JSON objects using keyspaces that are equivalent to a database in SQL. Each keyspace is divided into column families that are similar to tables and comprise of rows and sets of columns.

In one implementation, introspective analyzer 175 includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parsing or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by introspective analyzer 175 are not homogenous (e.g., there are many different sources in many different formats), certain implementations employ at least one metadata parser per cloud service, and in some cases more than one. In other implementations, introspective analyzer 175 uses monitor 184 to inspect the cloud services and assemble content metadata. In one use case, the identification of sensitive documents is based on prior inspection of the document. Users can manually tag documents as sensitive, and this manual tagging updates the document metadata in the cloud services. It is then possible to retrieve the document metadata from the cloud service using exposed APIs and use them as an indicator of sensitivity.

Continuing further with the description of FIG. 1A, system 100 can include any number of cloud-based services 108: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs.

Examples of common cloud-based services today include Salesforce.com™, Box™, Dropbox™, Google Apps™, Amazon AWS™, Microsoft Office 365™, Workday™, Oracle on Demand™, Taleo™, Yammer™, Jive™, and Concur™.

In the interconnection of the elements of system 100, network 145 couples computers 112*a-n*, tablets 122*a-n*, cell phones 132*a-n*, smart watches 142*a-n*, cloud-based hosting service 118, web email services 128, video, messaging and voice call services 138, streaming services 148, file transfer services 158, cloud-based storage service 168 and N-CASB 155 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1A, N-CASB 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service platforms such as Rackspace, Heroku or Force.com from Salesforce could be used rather than implementing N-CASB 155 on direct physical computers or traditional virtual machines. Additionally, one or more engines can be used and one or more points of presence (POPs) can be established to implement the security functions. The engines or system components of FIG. 1A are implemented by software running on varying types of computing devices. Example devices are a workstation, a server, a computing cluster, a blade server, and a server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs is hosted on the client's premises or located in a virtual private network controlled by the client.

N-CASB 155 provides a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 108 and organization network 102. Although we use the term "network security system" to describe N-CASB 155, more generally the system provides application visibility and control functions as well as security. In one example, thirty-five thousand cloud applications are resident in libraries that intersect with servers in use by computers 112*a-n*, tablets 122*a-n*, cell phones 132*a-n* and smart watches 142*a-n* in organization network 102.

Computers 112*a-n*, tablets 122*a-n*, cell phones 132*a-n* and smart watches 142*a-n* in organization network 102 include management clients with a web browser with a secure web-delivered interface provided by N-CASB 155 to define and administer content policies 187, according to one implementation. N-CASB 155 is a multi-tenant system, so a user of a management client can only change content policies 187 associated with their organization, according to some implementations. In some implementations, APIs can be provided for programmatically defining and or updating policies. In such implementations, management clients can include one or more servers, e.g. a corporate identities directory such as a Microsoft Active Directory, pushing updates, and/or responding to pull requests for updates to the content policies 187. Both systems can coexist; for example, some companies may use a corporate identities directory to automate identification of users within the organization while using a web interface for tailoring policies to their needs. Management clients are assigned roles and access to the N-CASB 155 data is controlled based on roles, e.g. read-only vs. read-write.

In addition to periodically generating the user-by-user data and the file-by-file data and persisting it in metadata store 178, an active analyzer and introspective analyzer (not shown) also enforce security policies on the cloud traffic. For further information regarding the functionality of active analyzer and introspective analyzer, reference can be made to, for example, commonly owned U.S. Pat. Nos. 9,398,102; 9,270,765; 9,928,377; and U.S. patent application Ser. No. 15/368,246; Cheng, Ithal, Narayanaswamy and Malmskog *Cloud Security For Dummies, Netskope Special Edition*, John Wiley & Sons, Inc. 2015; "*Netskope Introspection*" by Netskope, Inc.; "*Data Loss Prevention and Monitoring in the Cloud*" by Netskope, Inc.; "*Cloud Data Loss Prevention Reference Architecture*" by Netskope, Inc.; "*The 5 Steps to Cloud Confidence*" by Netskope, Inc.; "*The Netskope Active Platform*" by Netskope, Inc.; "*The Netskope Advantage: Three "Must-Have" Requirements for Cloud Access Security Brokers*" by Netskope, Inc.; "*The 15 Critical CASB Use Cases*" by Netskope, Inc.; "*Netskope Active Cloud DLP*" by Netskope, Inc.; "*Repave the Cloud-Data Breach Collision Course*" by Netskope, Inc.; and "*Netskope Cloud Confidence Index™*" by Netskope, Inc., which are incorporated by reference for all purposes as if fully set forth herein.

For system 100, a control plane may be used along with or instead of management plane 174 and data plane 180. The specific division of functionality between these groups is an implementation choice. Similarly, the functionality can be highly distributed across a number of points of presence (POPs) to improve locality, performance, and/or security. In one implementation, the data plane is on premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

Figure 1B:
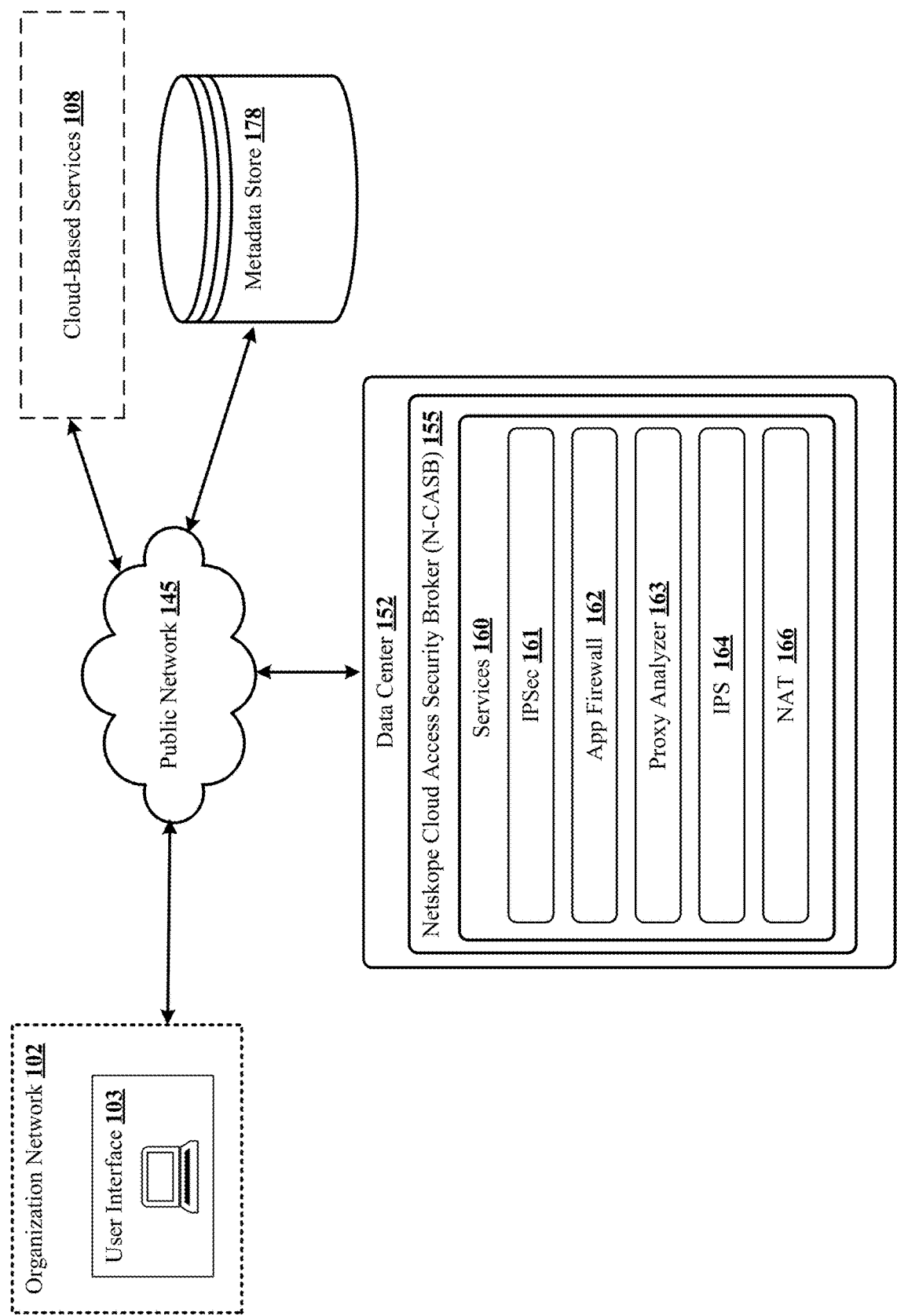
FIG. 1B shows a block diagram for load balancing in a dynamic service chain.

FIG. 1B shows a simplified block diagram for load balancing in a dynamic service chain, with organization network 102 with user interface 152 usable by security administrators to interact with the network security system and cloud-based services described relative to FIG. 1A. Data center 152 includes Netskope cloud access security broker (N-CASB) 155 with services 160. Many possible services can be selected by tenants for processing data flows of their users. The services selected for a tenant are referred to in the service chain for the tenant. A single tenant can have multiple service chains configured for different types of data packets and service chains can be reconfigured as the needs of a tenant evolve. One security service is a native service implemented by the security service provider. Another security service is Internet Protocol Security (IPsec) 161, a suite of protocols used in virtual private networks (VPNs) to authenticate and encrypt the packets of data sent over the Internet protocol network (IPN). Another security service is app firewall 162 that controls input, output, and access from, to, or by an application, by monitoring and potentially blocking the input, output, or system service calls that do not meet the configured security services policy. An example app firewall is web application firewall (WAF) for HTTP applications. Another security service is proxy analyzer 163 that examines and classifies data files as sensitive or not using content evaluation techniques described in U.S. Non Provisional application Ser. No. 15/368,246, entitled "MIDDLE WARE SECURITY LAYER FOR CLOUD COMPUTING SERVICES" which is incorporated in full herein. Proxy analyzer 163 can function as a firewall service in one implementation. Yet another security service is intrusion prevention system (IPS) 164 that monitors a tenant's network for malicious activity or policy violations, often using a security information and event management (STEM) system to collect malicious activity and policy violations centrally. Services 160 also includes IP network address translation (NAT) 166, which can remap one IP address space into another by modifying network address information in the IP header of packets while they are in transit across a traffic routing device. User-by-user data and the file-by-file security data is stored in metadata store 178. In one implementation, the user-by-user data and the file-by-file data is stored in a semi-structured data format like JSON, BSON (Binary JSON), XML, Protobuf, Avro, or Thrift object, which comprises fields (or columns) and corresponding values of potentially different types like numbers, strings, arrays, and objects.

Figure 2A:
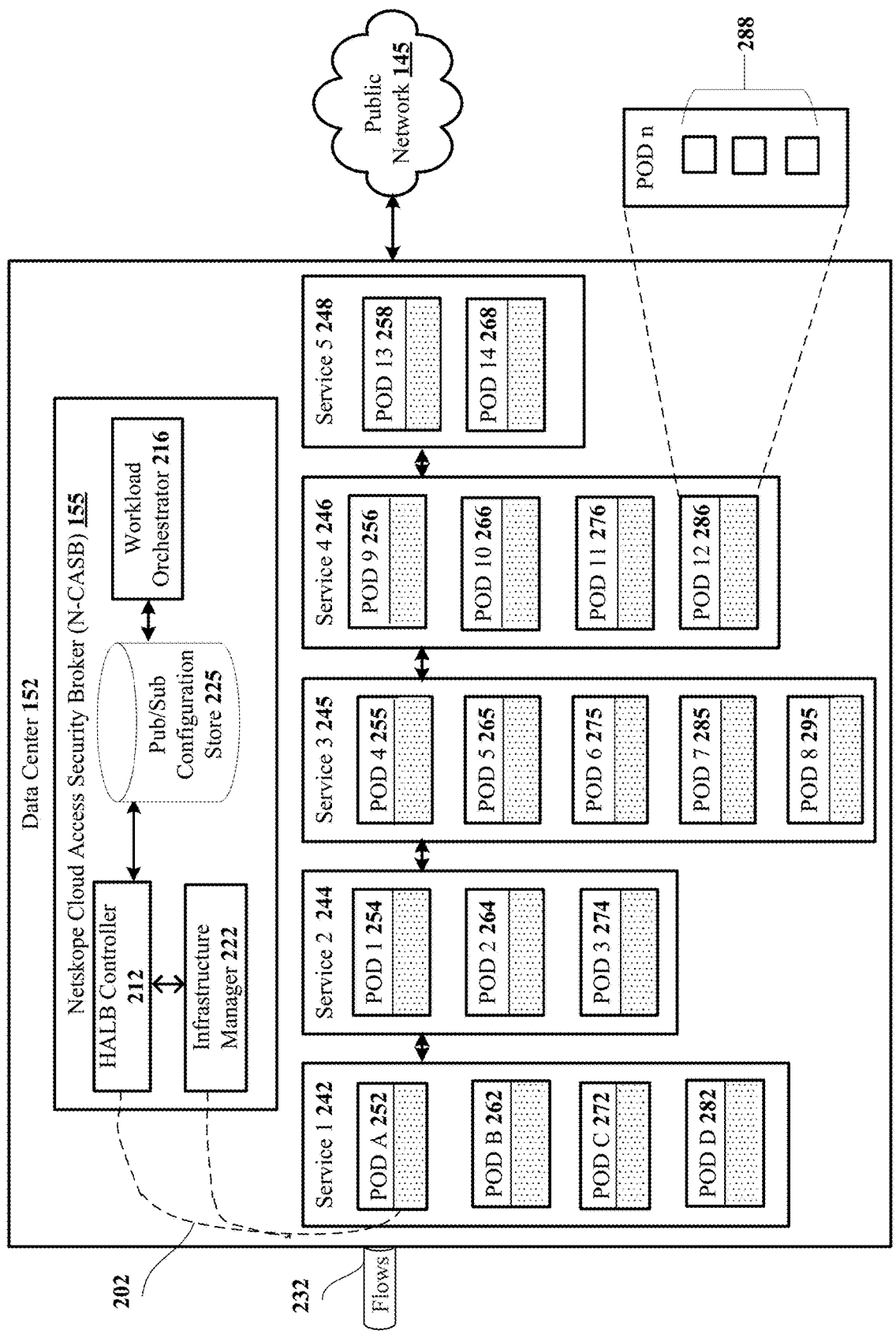
FIG. 2A shows a block diagram for security services at a data center, according to one implementation of the disclosed technology.

FIG. 2A shows a block diagram for security services in a services mesh at data center 152. A data center can also be referred to as a point of presence (PoP), cluster or set of nodes. A node refers to a physical machine running multiple pods. In one implementation, one node runs two to three pods, which each include a set of containers which run processes. Three to four containers run in a pod and a single process runs in a container, in one implementation. Each process runs a set of threads, often with one core provisioned per thread. In another example case, configurations with different numbers of pods and containers and processes can be configured in data center 152. Disclosed N-CASB 155 includes high availability load balancing (HALB) controller 212, workload orchestrator 216, publish-subscribe rich context configuration store 225 and infrastructure manager 222. Data center 152 includes services 242, 244, 245, 246, 248 for processing data flows 232 at data center 152, with services 160 for IPsec 161, app firewall 162, proxy analyzer 163, IPS 164, and NAT 166 described relative to FIG. 1B earlier, along with any additional security services developed by the cloud security provider. Data center 152 includes an example set of services mapped to a set of pods for each of five different services, and can include additional pods and services (not shown), that process flows of packets: service 1 242 with pod A 252, pod B 262, pod C 272 and pod D 282; Service 2 244 with pod 1 254, pod 2 264 and pod 3 274; service 3 245 with pod 4 255, pod 5 265, pod 6 275, pod 7 285 and pod 8 295; service 4 246 with pod 9 256, pod 10 266, pod 11 276, pod 12 286; and service 5 248 with pod 13 258 and pod 14 268. A pod is a group of containers that are deployed on the same server, in one implementation. A Docker container running on a physical host is a lightweight self-contained environment sharing the host operating system, and with its own processor address space, memory address space and networking address space with network layer resources including IP addresses and transport layer resources including TCP port numbers. Each pod n can include multiple containers 288, in one implementation. Each container utilizes a distributed service chain plugin to implement integrated load balancing with high availability via infrastructure manager 222 within the container, as represented by dotted connection 202 and a shaded area in the pods and described in detail later. Infrastructure manager 222 utilizes the service chain for the tenant to determine which service to route the packets to next. Infrastructure manager 222 also serves as the pod manager interface with HALB controller 212 and allocates IP addresses for pods and acts as the interface to workload orchestrator 216 as well as additional scheduling and management functionality. Infrastructure manager 222 provides routing services usable by the services provided by other service vendors. Every container processes the ingress and egress of packet flows, utilizing data plane development kit (DPDK) libraries and network interface controller (NIC) drivers to process packets and maintain state, and accelerating packet processing workloads. Vector packet processing (VPP) interfaces with infrastructure manager 222 and services 160 plugins.

Continuing with the description of FIG. 2A, workload orchestrator 216 manages the clusters of pods, detecting new pod instances and dropped service pods and storing configuration data and the status of the pods in publish-subscribe rich context configuration store 225, a distributed key-value data store, resulting in a large lookup table with each pod using a number of entries in the table. Workload orchestrator 216 detects each new pod instance and the scheduling map is integrated with Dynamic Host Configuration Protocol (DHCP) automatic assignment of IP addresses and related configuration information to the new pod instance. Publish-subscribe rich context configuration store 225 also stores the services map that lists, by subscriber, the security services that each tenant has contracted to receive from the security service provider. In one example, workload orchestrator 216 is implemented using Kubernetes as the distributed system for assigning unique IP addresses and for scheduling to ensure enough available containers in pods. Kubernetes is a container orchestration system for automating deployment, scaling and management. Publish-subscribe rich context configuration store 225 utilizes etcd in one example; and in a different implementation a configuration store such as Apache ZooKeeper can be utilized.

Further continuing with the description of FIG. 2A, data flows 232 are processed by a sequential set of security services specified by the service chain for the subscriber, as they traverse a data path to the cloud, via public network 145. Packets for a subscriber are classified on ingress at a distributed service chain plugin in a container in a pod at data center 152 and are then forwarded through that set of functions for processing at a first service node that performs a first security service in a service chain. Based on the processing, the distributed service chain plugin at the container determines a second service among at least second and third services which the subscriber has selected, that should next handle the packet. Packets may be reclassified as a result of this processing.

Data center 152 includes a set of pods that process packets for each of five different services in a services mesh in the example described relative to FIG. 2A. A large lookup table with each pod using a number of entries in the table, is described relative to FIG. 2A. Packets arrive for processing at data center 152 with packet structure 305 described relative to FIG. 3. The disclosed distributed system for load balancing in a dynamic service chain deploys a software load balancer to each Docker container in each pod that processes packets for a service. A consistent hashing algorithm is utilized to generate a consistent hashing table (CHT) for distributing packet traffic load for the services specified for the tenant. The distributed hashing scheme allows scaling of the number of containers without affecting the overall system. Maglev hashing, described in "*Maglev: A Fast and Reliable Software Network Load Balancer*" is utilized in one implementation. A different consistent hashing algorithm could be used in another implementation. The Maglev hash key is calculated using the 6-tuple for the packet to be processed. The 6-tuple of a packet refers to the client ID, the source IP, source port, destination IP, destination port and IP protocol number. The client ID information is stored in the added NSH header, in one implementation.

The CHT represents the ports that are deployed, specifying the nodes that are available to process packets. The CHT changes when a port is added or a port is taken out of service, and specifies, for a given 6-tuple, where to send the packet. Individual pods can store a local copy of the CHT in a flow table to record the service chain specified in the CHT for faster table access. Every container on every service pod utilizes the same consistent hashing table (CHT) content that holds the list of available pods. A service map lists the PODS and containers that are available and identifies each service instance as having a primary role or a secondary role, in some implementations. In other cases, roles can include four distinct roles: primary role, secondary role, tertiary role and quaternary role.

Figure 2B:
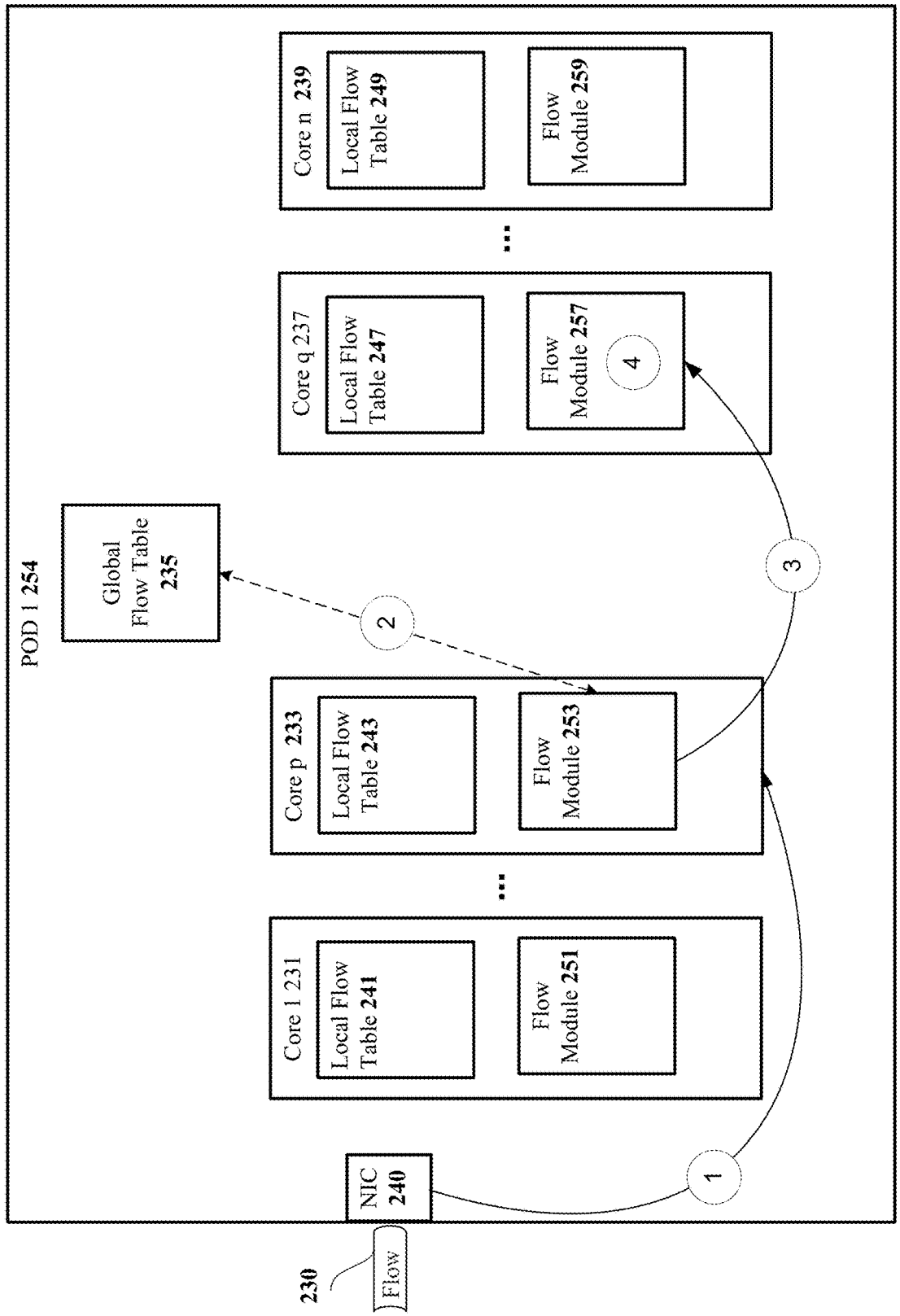
FIG. 2B illustrates a block diagram for a representative pod of FIG. 2A and shows the flow of a packet to a core for processing.

FIG. 2B illustrates a block diagram for a representative pod 254 of FIG. 2A and shows the flow of a packet to a core for processing. Pod 254 includes global flow table 235, n cores shown as core a 231, core p 233, core q 237 and core n 239. The number of cores can be configured based on the expected traffic flow. One data center may have as little as one gigabit/sec of traffic while another data center may have a terabit/second of traffic and need as many as sixty-four cores. Each of the cores in pod 1 254 includes a local flow table 241, 243, 247, 249 data structure in which the various security service modules, such as NAT and App firewall, store module-specific data. Also, each of the cores in pod 1 254 includes a flow module 251, 253, 257, 259 plugin with a set of nodes for distributing flow table functionality. Global flow table 235 maps the 6 tuple of a packet (client ID, the source IP, source port, destination IP, destination port and IP protocol number) to a core id. In one case, flow table 235 is implemented as a lockless flow table. A configurable value for each coreid, for example −1, can be used to indicate that a packet is part of an existing stream, with packets sprayed so that the same thread processes all packets from a given L4-L7 data flow.

Continuing the description of FIG. 2B, packet flow 230 arrives at pod 254 at NIC 240 and the packet gets sprayed to an arbitrary core in the first step. The outer UDP header 325 which was added to the original packet, with source port and destination port randomized, is used in the packet spraying, to increase entropy in the selection of which core is to receive the packet. In this example the packet arrives at core p 233 in step one. Flow module 253 of core p 233 does a lookup in local flow table 243 to determine whether earlier packets in the stream were processed by flow module 253. If no entry for the stream exists in local flow table 243, flow module 253 does a lookup in global flow table 235 in step two, and sends the packet to the core that owns the flow (step three). A configurable-length unidirectional packet queue (not shown) that holds pointers to packets to be processed by that core is set up between each pair of cores. The cores process packets received from queues locally, using the local flow table (step four). When lookup in global flow table 235 results in a miss, a new entry is created, with the current core as the owner. This is useful, since when receive side scaling (RSS) is utilized, MC 240 keeps sending packets to the same core as the earlier packets in the packet stream, in one implementation. That is, packets are sprayed in such a fashion so that the same thread processes all packets from a given flow. The architecture is applicable to both physical hardware and virtual machines (VMs), so VM NICs that support RSS can be utilized for packet distribution. One or more NICs are utilized per pod in one implementation; and a single NIC can be virtualized into many virtual functions (VFs) via single-root input/output virtualization (SR-IOV) and each pod includes one or more VFs.

Packet Structure and Flow Routing Example

Figure 3:
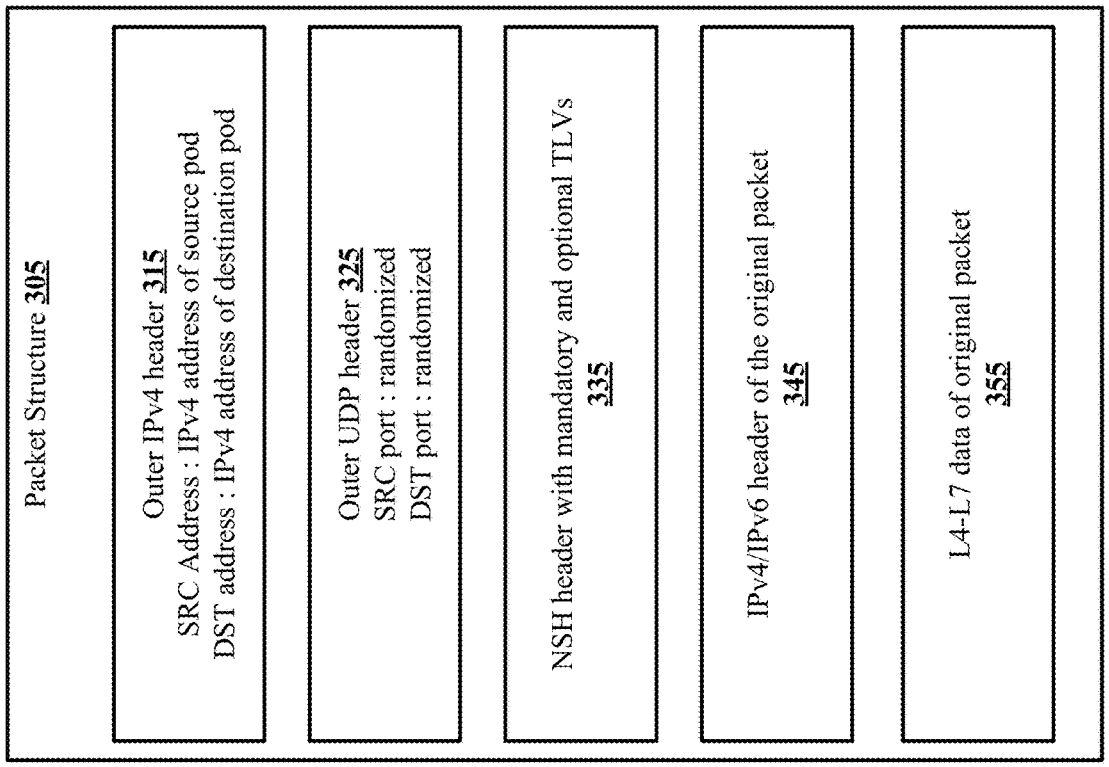
FIG. 3 shows an exemplary packet structure after a network service header is imposed on a packet.

FIG. 3 shows an exemplary packet structure 305 after a network service header (NSH), which provides metadata for exchange along instantiated service paths, is imposed on a packet. The NSH provides data plane encapsulation that utilizes the network overlay topology used to deliver packets to the requisite services. The packet structure 305 includes original packet L4-L7 data 355 and IPv4/IPv6 header 345 with source IP address and destination IP address for the packet, as well as additional field values. Packet structure 305 also includes NSH header with mandatory and optional type-length-value (TLV) data 335 with a service chain with a list of services for the packet as specified by the subscriber to the services, the name of the user (optionally) and additional context information for exchange between service functions. The field list is not exhaustive of the fields that are included, but rather highlights key fields. An outer UDP header 325 is added to the original packet, with source port and destination port randomized to increase entropy for the selection of which core in a pod is to process the packet for the service (from the list of services). When multiple packets are part of a single flow, they can be mapped to the same pod for processing for the service. Packet structure 305 also includes outer IPv4 header 315, which includes the source address of the source pod for the packet and the destination address for the destination pod for the packet.

Next we describe an example for processing a stream of packets. Construct the 6-tuple using the data from an exemplary packet described earlier. Access the service map for the packet, in the local flow table. If the service action is allowed, transmit the packet and update the stats. If the action is blocked, drop the packet and update the stats in the flow table. If the action is allowed, assert action=inspect and AppID=inspecting and store the states in the flow table.

In a service map example described next, an app firewall security service instance uses the service map when making the decision of where to send a received packet next after processing by the first service, accessing a flow table using outer IP header data carried by the packet to select a second service node, from among a plurality of service nodes performing the second service in the service chain. The next step is routing the packet to the selected second service node upon egress from the first service node. In this example, the service map shows ipsec service is available on pod 8 and pod 9, appfwl is available on pod 1, pod 2 and pod 3, and IPS service is available on pod 4, pod 5 and pod 6. The example shows the IP addresses for each of pods 1, 2 and 3. Additional pod IP addresses are omitted for brevity.

```
Pods:                {
    ipsec:               [p8, p9],
    appfwl               p1, p2, p3],
    ips:                 [p4, p5, p6]
}
Ipaddrs:             {
    p1:                  1.1.1.1,
    p2:                  1.1.1.2,
    p3:                  1.1.1.3
    ...
    }
}
```

For the example, we use the Maglev load balancing algorithm to calculate the CHT for each service (appfwl/ips)

and we represent the hashed values as integers for simplicity. The hashed keys in the CHT are shown with associated values next.

| At IPsec pod: Appfwl: | |
|---|---|
| Key | value |
| 0 | p1 |
| 1 | p2 |
| 2 | p2 |
| 3 | p1 |
| 4 | p3 |
| 5 | p3 |
| 6 | p1 |
| 7 | p2 |
| 8 | p3 |
| ... | |

At packet processing time, a packet is received, with the format described relative to FIG. 3: outer IP header 315, outer UDP header 325, NSH header 335 and inner payload which includes the header of the original packet 345 and the data of the original packet 355. To determine where to send the packet next, the current service looks up the next service in the service chain for the subscriber. For this example, we assume the next service is appfwl. The hash key is constructed using the tenantid from NSH 335, and scrip, dstip, protocol, sport, dport 5-tuple from inner payload 355. For an example hash value 4, look up the value for key=4 in the CHT shown earlier. The value is p3 which refers to pod 3. We use the p3 value to look up the IP address of p3. Then we set the destination IP dstip as 1.1.1.3 for pod 3 in the outer IP packet header 315, update the flow table to specify p3 as the second service node providing the second service and send the packet to the appfwl service on pod 3. The example shows accessing an available nodes list in a consistent hash table (CHT) of service nodes performing the second service, selecting one of the available nodes using a six-tuple hash as a key to the CHT table to select the second service node, and updating the flow table to specify the second service node as providing the second service for packets sharing the header data.

During real time ingress of packets to security services and egress of processed packets from security services, with flows and pods running, infrastructure manager 222 and HALB controller 212 monitor utilization of the available bandwidth for processing packets. If the traffic volume to the data center 152 exceeds a configurable high water mark (100 GB traffic in one example implementation) or if traffic volumes spike beyond a defined threshold, then HALB controller 212 signals workload orchestrator 216 to provision a new pod to become available for the impacted security service. In another implementation, the services processing packets can be performing functions different from security services. After the newly added pod is provisioned, workload orchestrator 216 schedules the packets and streams coming in for processing. HALB controller 212 communicates the updated CHT that includes the added pod or pods to all the containers in all the pods and can redistribute the load to lessen the traffic volume per worker service in the system. In another case, a pod stops responding, effectively dropping out of service, and workload orchestrator 216 updates the CHT to reflect the change in available pods and stores the updated CHT in publish subscribe configuration store 225. HALB controller 212 accesses the updated CHT in publish subscribe configuration store 225 and communicates the updated CHT to the remaining pods. Future packets get processed by available services on containers in available pods.

State Synchronization for Service Assurance

Figure 4A:
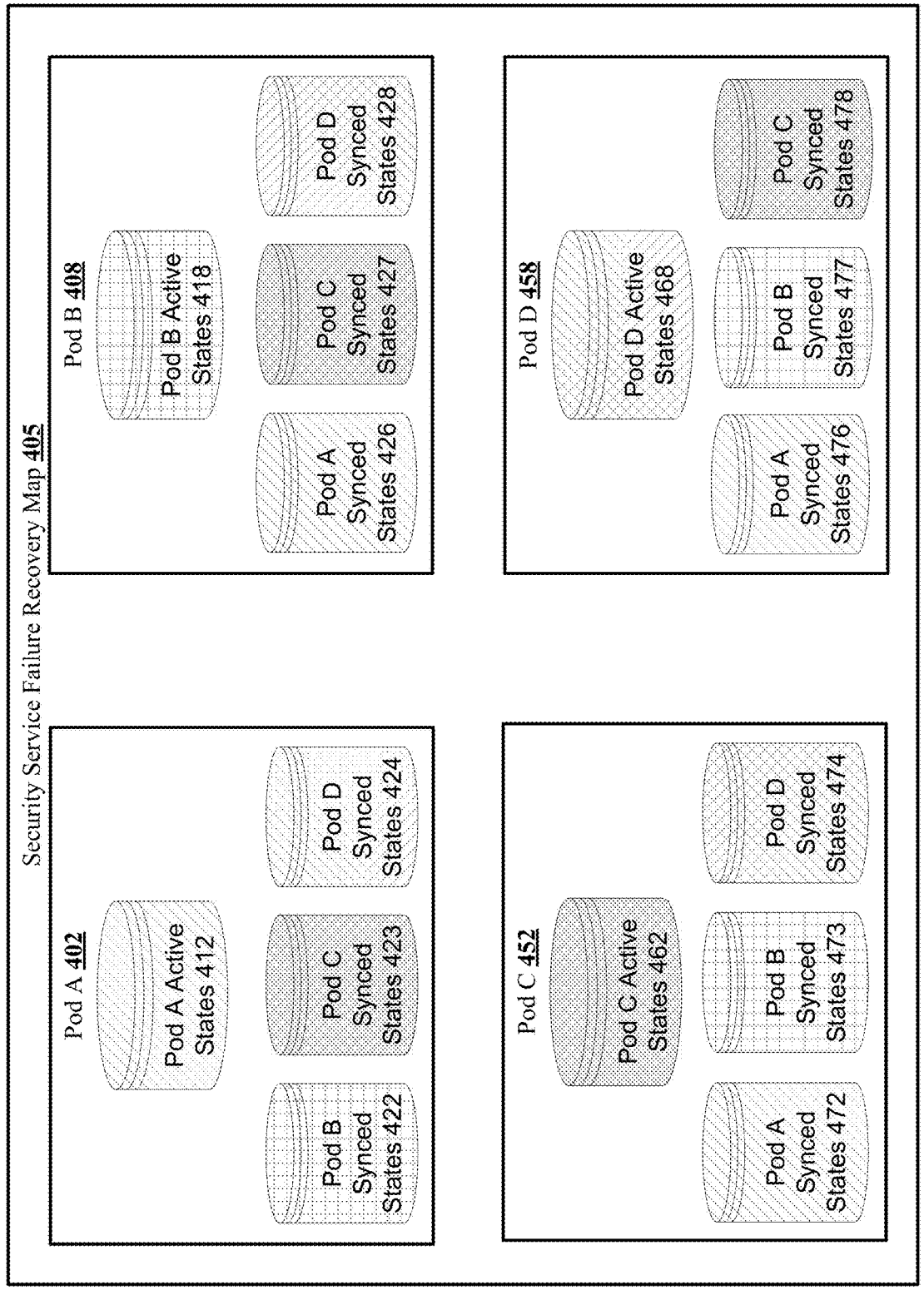
FIG. 4A illustrates an example disclosed system for synchronization of states across multiple pods that supply a service, for improved recovery from failure of a service instance in a service map.

FIG. 4A illustrates an example disclosed system for synchronization of states across multiple pods that supply a service, for improved recovery from failure of a service instance in a service map. The example shows security service failure recovery map 405 for four example pods in a services mesh, offering the same service. Pod A 402 handles pod A active states 412, and additionally captures and stores pod B synchronized states 422, pod C synchronized states 423 and pod D synchronized states 424. Similarly, pod B 408 handles pod B active states 418, and additionally captures and stores pod A synchronized states 426, pod C synchronized states 427 and pod D synchronized states 428. Continuing the description of security service failure recovery map 405, pod C 452 handles pod C active states 462, and additionally captures and stores pod A synchronized states 472, pod C synchronized states 473 and pod D synchronized states 474. Similarly, pod D 458 handles pod D active states 468, and additionally captures and stores pod A synchronized states 476, pod B synchronized states 477 and pod C synchronized states 478. The state synchronization enables near real time recovery for packet streams in instances in which a pod becomes inactive. The remaining pods hold synchronized states for the pod that has become unavailable, so HALB controller 212 can balance the load among the remaining pods that are available.

Figure 4B:
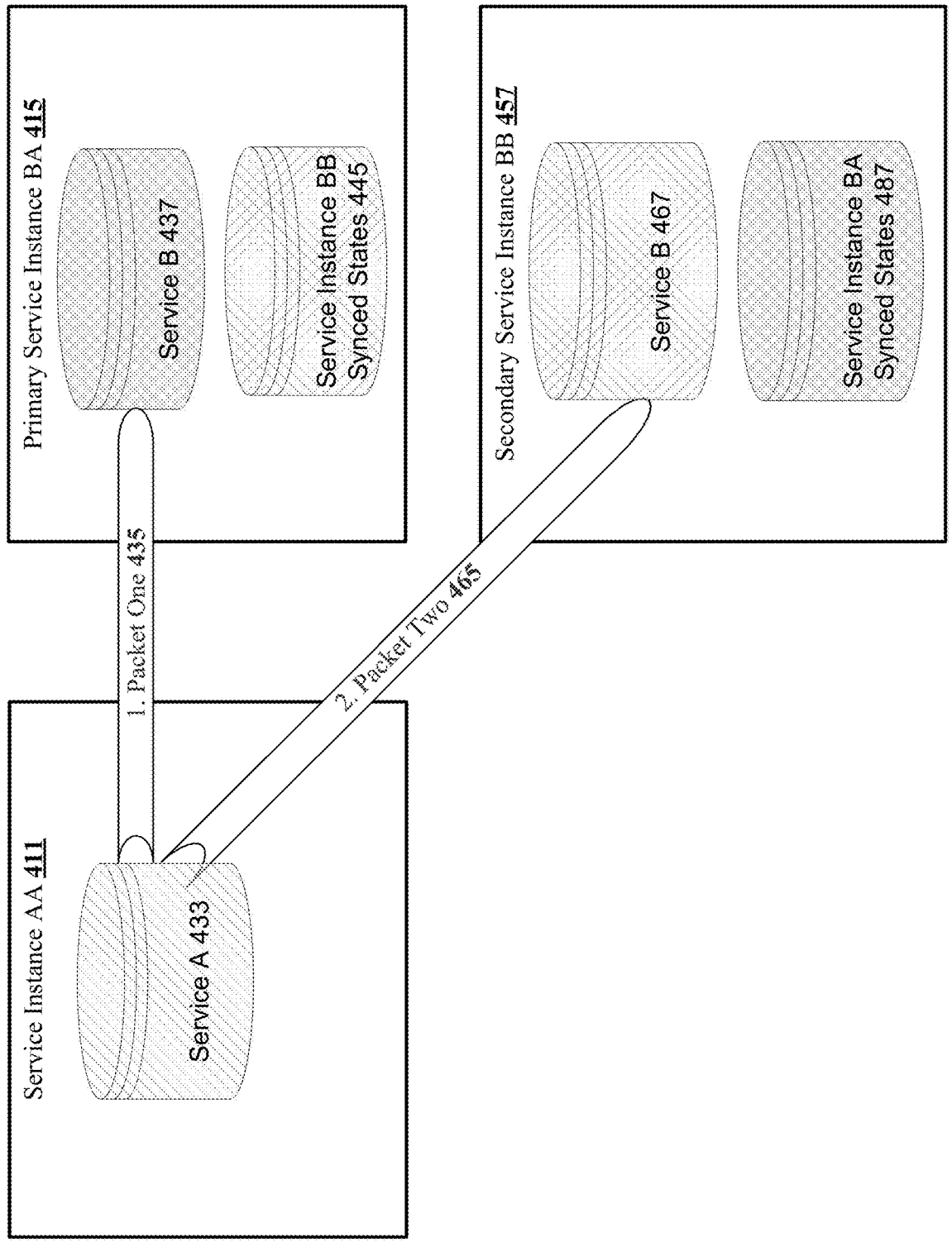
FIG. 4B shows an example, with service instances that perform services A and B, respectively, in a service chain.

FIG. 4B shows a specific synchronization example, with service instance AA 411 and service instances BA 415 and BB 457 that perform services A 433 and B 437, 467, respectively, in a service chain. Service instance BA 415 is designated in the primary role for providing service B, so receives from service instance AA 411 a first packet 435 in a stream for a subscriber. The first packet includes, in an added header, a stream affinity code that is consistent for packets in the stream. In one case, the stream affinity code is an outer IP header such as has been described earlier. In another example implementation, a different encoding can be utilized. Service instance BA 415, in a primary role specified in a service map distributed to service instances, processes the first packet by performing service B 437. Service instance BA 415 identifies service instance BB 457 as having a secondary role specified in the service map distributed to service instances and synchronizes service instance BA synced states 487 information with service instance BB 457 after processing the first packet. For the sake of the example, we assume that service instance BA 415 becomes unresponsive for some period of time of at least 20 seconds. Monitoring agent (not shown) monitors packet flows at service instances and signals when containers and pods become unavailable, and the service map gets updated to reflect which service instances are available. Monitoring agent monitors metrics of each container and reports the metrics every 30 seconds to a metric utilization service, in one implementation. In one case, auto-scaling can be configured.

Continuing the description of FIG. 4B, after failure of service instance BA 415, service instance AA 411 receives an updated service map and prepares to forward a second packet, which includes the same stream affinity code as the first packet, to service instance BA 415 for performance of service B 437. Preparation includes determining from the updated service map that the service instance BA 415 is no longer available, and determining from the updated service map that the service instance BB 457 has the secondary role. Service A 433 at service instance AA 411 forwards the second packet 465 to service B 467 at service instance BB 457 instead of to service B 437 at service instance BA 415.

Next, we describe an example workflow for load balancing in a dynamic service chain, and a workflow for improved recovery from failure of a service instance in a service chain that performs at least two services, using multiple service instances to perform the services.

Workflows

Figure 5:
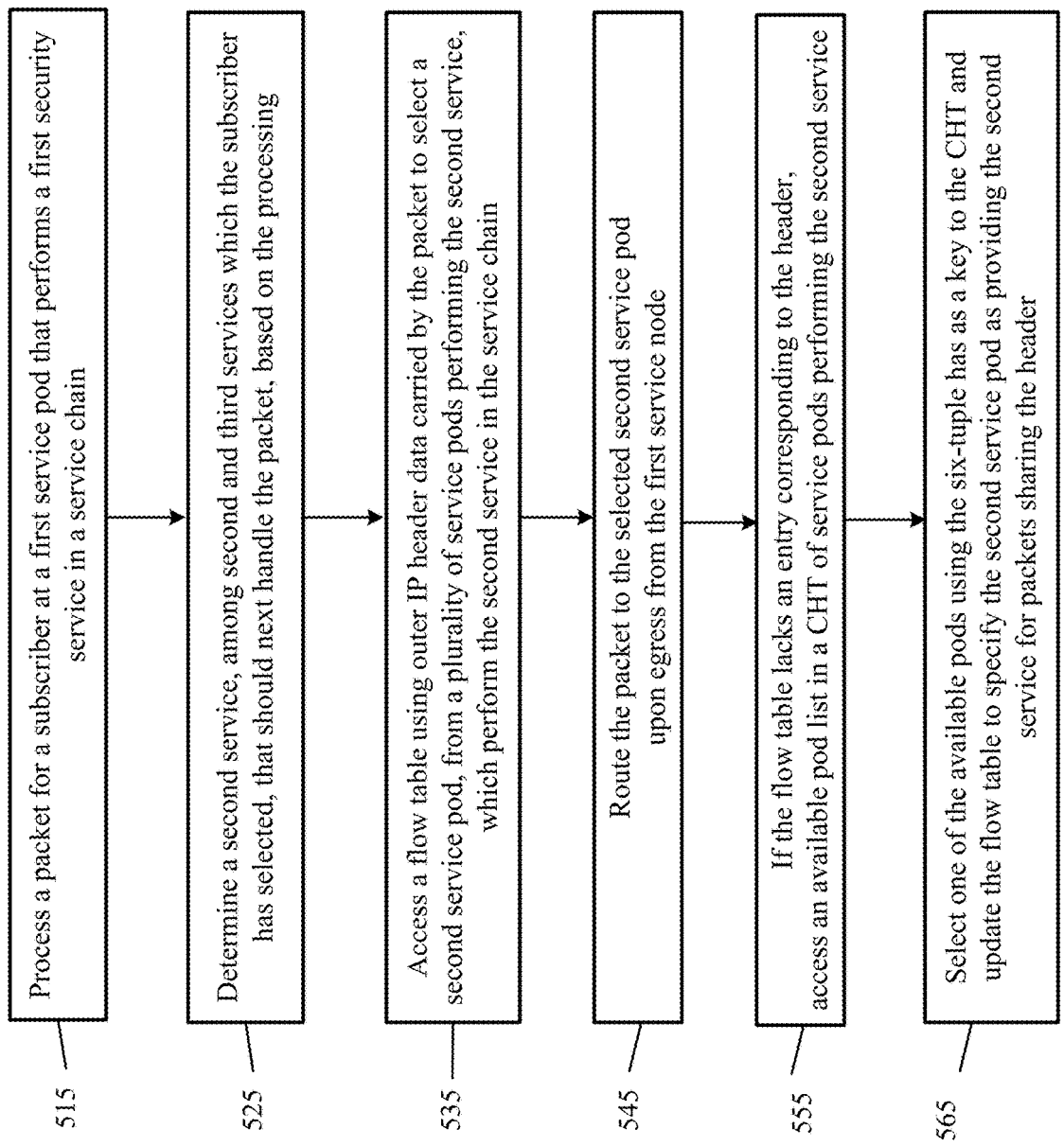
FIG. 5 illustrates a representative method of load balancing in a dynamic service chain, for reducing latency and increasing availability and scalability in flexibly configurable data paths through service chains while applying security services.

FIG. 5 shows a representative method of load balancing in a dynamic service chain, for reducing latency and increasing availability and scalability in flexibly configurable data paths through service chains while applying security services.

Flowchart 500 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 5. Multiple actions can be combined in some implementations. For convenience, this flowchart is described with reference to a system which includes Netskope cloud access security broker (N-CASB) and load balancing in a dynamic service chain while applying security services in the cloud.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 5 begins with action 515 for processing a packet for a subscriber at a first service pod that performs a first security service in a service chain.

Process 500 continues at action 525, based on the processing, determining a second service, among at least second and third services which the subscriber has selected, that should next handle the packet.

Action 535 includes accessing a flow table using outer IP header data carried by the packet to select a second service pod, from among a plurality of service pods performing the second service, which perform the second service in the service chain.

Action 545 includes routing the packet to the selected second service pod upon egress from the first service pod.

If the flow table lacks an entry corresponding to the header data, take action 555 accessing an available pods list in a consistent hash (lookup) table (CHT) of service pods performing the second service.

At action 565, select one of the available pods using a six-tuple hash as a key to the CHT table to select the second service pod, and update the flow table to specify the second service pod as providing the second service for packets sharing the header data.

Other implementations may perform the actions in different orders and/or with different, fewer or additional actions than those illustrated in FIG. 5. Multiple actions can be combined in some implementations. For convenience, this flowchart is described with reference to the system that carries out a method. The system is not necessarily part of the method.

Figure 7:
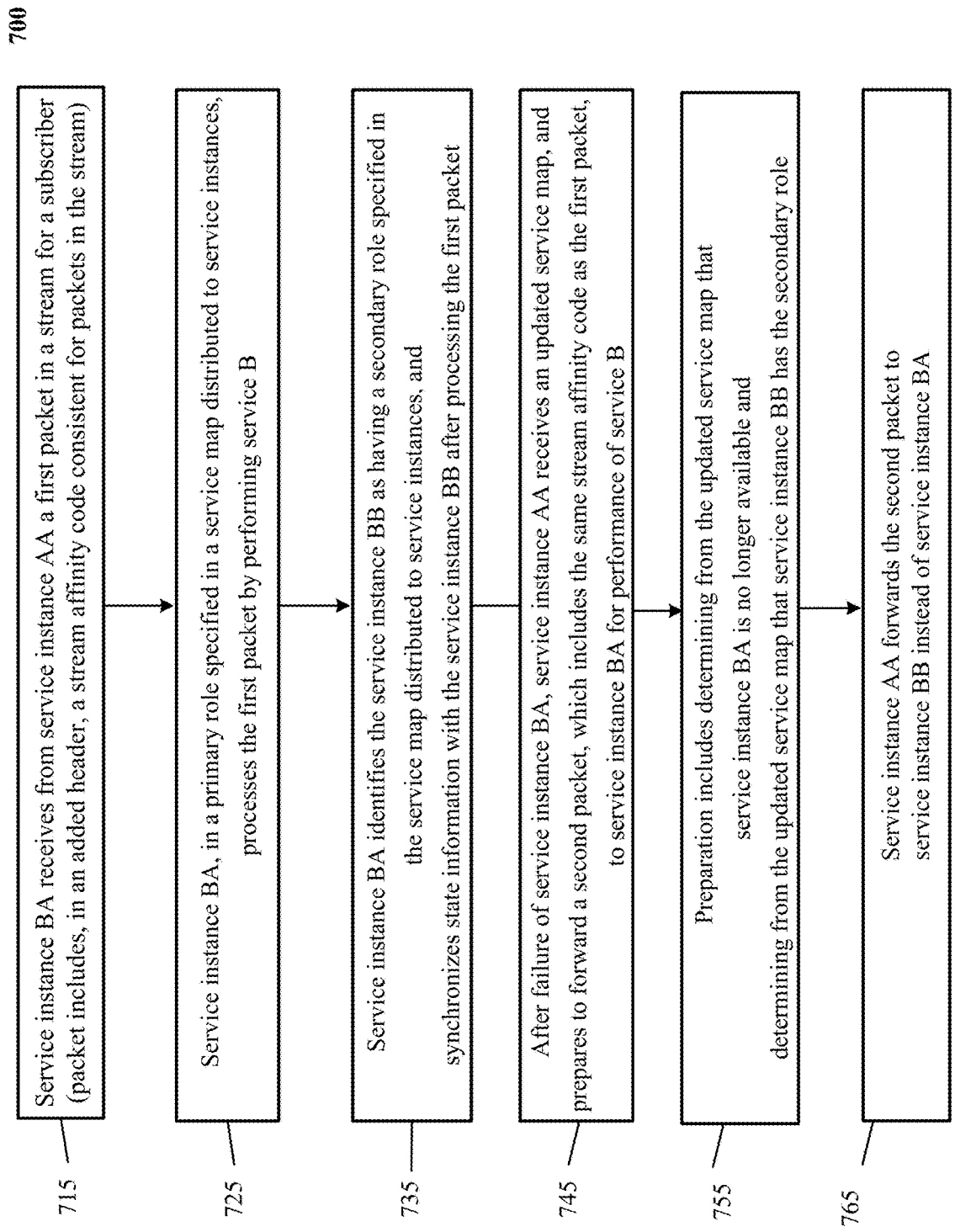
FIG. 7 shows a representative method for improved recovery from failure of a service instance in a service chain that performs at least services A and B, using service instance AA and service instances BA and BB to perform the services A and B, respectively.

FIG. 7 shows a representative method for improved recovery from failure of a service instance in a service chain that performs at least services A and B, using service instance AA and service instances BA and BB to perform the services A and B, respectively.

Flowchart 700 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 7. Multiple actions can be combined in some implementations. For convenience, this flowchart is described with reference to a system which includes Netskope cloud access security broker (N-CASB), load balancing in a dynamic service chain while applying security services in the cloud, and improved recovery from failure of a service instance, in a service chain of services.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 7 begins with action 715 for service instance BA receiving from the service instance AA a first packet in a stream for a subscriber, in which the first packet includes in an added header a stream affinity code that is consistent for packets in the stream.

Process 700 continues at action 725, with service instance BA, in a primary role specified in a service map distributed to service instances, processing the first packet by performing service B.

At action 735, service instance BA identifies service instance BB as having a secondary role specified in the service map distributed to service instances, and synchronizing state information with service instance BB after processing the first packet.

At action 745, after failure of service instance BA, service instance AA receives an updated service map and prepares to forward a second packet, which includes the same stream affinity code as the first packet, to service instance BA for performance of service B.

Action 755 includes determining from the updated service map that service instance BA is no longer available and determining from the updated service map that the service instance BB has the secondary role.

At action 765, service instance AA forwards the second packet to service instance BB instead of service instance BA.

Other implementations may perform the actions in different orders and/or with different, fewer or additional actions than those illustrated in FIG. 7. Multiple actions can be combined in some implementations.

Computer System

Figure 6:
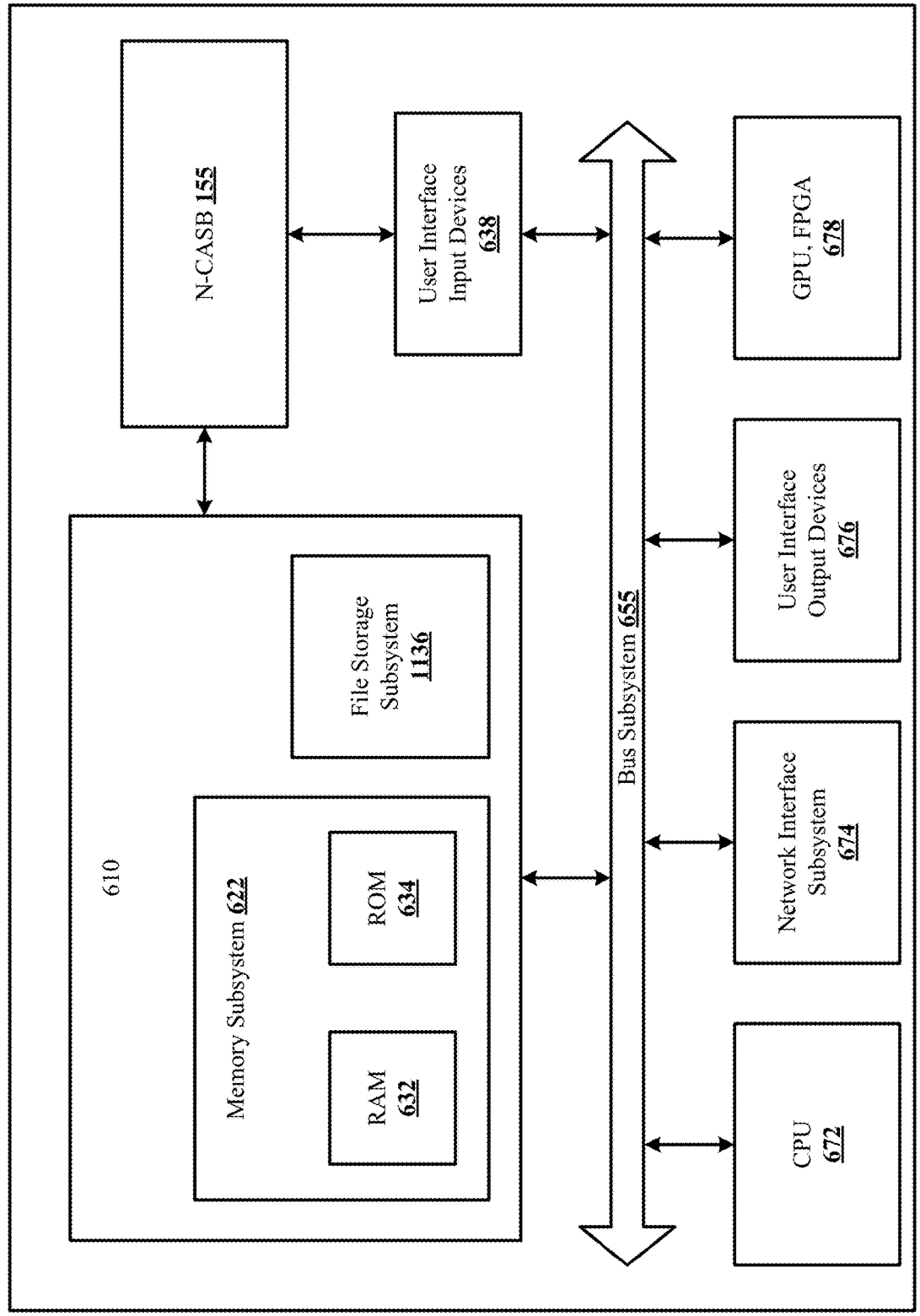
FIG. 6 is a simplified block diagram of a computer system that can be used to implement load balancing in a dynamic service chain, and for improved recovery from failure of a service instance in a service chain.

FIG. 6 is a simplified block diagram of a computer system 600 that can be used to implement load balancing in a dynamic service chain, for reducing latency and increasing availability and scalability in flexibly configurable data paths through service chains while applying security services in the cloud. Computer system 600 is also usable to implement improved recovery from failure of a service instance, in a service chain of services that perform at least services A and B, using service instance AA and service instances BA and BB to perform the services A and B, respectively. Computer system 600 includes at least one central processing unit (CPU) 672 that communicates with a number of peripheral devices via bus subsystem 655, and Netskope cloud access security broker (N-CASB) 155 for providing network security services described herein. These peripheral devices can include a storage subsystem 610 including, for example, memory devices and a file storage subsystem 636, user interface input devices 638, user interface output devices 676, and a network interface subsystem 674. The input and output devices allow user interaction with computer system 600. Network interface subsystem 674 provides an interface to outside networks, including an interface to corresponding interface devices in other computer systems.

In one implementation, Netskope cloud access security broker (N-CASB) 155 of FIG. 1A and FIG. 1B is communicably linked to the storage subsystem 610 and the user interface input devices 638.

User interface input devices 638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 600.

User interface output devices 676 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 600 to the user or to another machine or computer system.

Storage subsystem 610 stores programming and data constructs that provide the functionality of some or all of the modules and methods described herein. Subsystem 678 can be graphics processing units (GPUs) or field-programmable gate arrays (FPGAs).

Memory subsystem 622 used in the storage subsystem 610 can include a number of memories including a main random access memory (RAM) 632 for storage of instructions and data during program execution and a read only memory (ROM) 634 in which fixed instructions are stored. A file storage subsystem 636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 636 in the storage subsystem 610, or in other machines accessible by the processor.

Bus subsystem 655 provides a mechanism for letting the various components and subsystems of computer system 600 communicate with each other as intended. Although bus subsystem 655 is shown schematically as a single bus, alternative implementations of the bus subsystem can use multiple busses.

Computer system 600 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 600 depicted in FIG. 6 is intended only as a specific example for purposes of illustrating the preferred embodiments of the present invention. Many other configurations of computer system 600 are possible having more or less components than the computer system depicted in FIG. 6.

Particular Implementations

Some particular implementations and features for distributed routing and load balancing in a dynamic service chain, and for improved recovery from failure of a service instance in a service chain of services are described in the following discussion.

In one disclosed implementation, a method of distributed routing and load balancing in a dynamic service chain includes receiving a packet for a subscriber at a first service instance, wherein the packet includes an added header, which includes a stream affinity code that is consistent for packets in a stream. The method also includes processing the packet at the first service instance, wherein the first service instance performs a first service in a service chain. The disclosed method further includes, based on the processing, the first service instance determining a second service, among at least second and third services to which the subscriber has subscribed, that should next handle the packet. Also included is the first service instance accessing a flow table using the stream affinity code to select a second service instance, from among a plurality of service instances performing the second service, which performs the second service in the service chain, and the first service instance routing the packet to the selected second service instance upon egress from the first service instance.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In some implementations of the disclosed method, the stream affinity code is included in an added IP header as IP source and destination. One implementation includes the first service instance routing the packet to the selected second service instance by updating the added IP header with the IP destination of the selected second service instance. The disclosed method also includes hashing the stream affinity code to access the flow table. In one implementation, wherein the flow table lacks an entry for the second service corresponding to the stream affinity code in the added header, the method further includes accessing a consistent hash table (CHT) of service instances performing the second service, selecting an available instance using a six-tuple hash as a key to the CHT table to select the second service instance, and updating the flow table to specify the second service instance as providing the second service for packets sharing the header. In some implementations, the disclosed method further includes selecting an alternate second service instance from the CHT and updating the flow table to specify the alternate second service instance. Some implementations also include a network service header (NSH) in the added header, which includes a client ID, and wherein the six-tuple hash is generated using the client ID and using source IP, source port, destination IP, destination port and IP protocol number for the packet. IN some implementations of the disclosed method, the flow table is maintained locally by the first service or instances of the first service.

In one implementation of the disclosed method, the service chain is a security service chain and at least the second and third services are security services. In many implementations of the method, instances of the first, second and third services run in containers and the containers are hosted in pods. In some implementations of the disclosed method, instances of the first, second and third services are implemented on virtual machines, bare metal servers or custom hardware. In some implementations, the packet further includes an added UDP header, which includes UDP source and/or destination ports, wherein the UDP source and/or destination ports are random or pseudo random values that are consistent for packets in a stream. This disclosed method further includes determining a core, from multiple cores running the second service instance, using the UDP source and/or destination values, and forwarding the received packet to the determined core and applying the second service to the packet. The forwarding can be accomplished by spraying the packet, in some implementations.

Some implementations of the disclosed method also include hashing values of the UDP source and/or destination ports to a hash key and using the hash key when determining the core. For some implementations of the disclosed method, instances of the first, second and third services include copies of a first code that implements multiple services. For some implementations, the disclosed method further includes the packet carrying a service chain in a packet header and the second and third services being among services specified in the service chain.

One implementation of a disclosed method of improved recovery from failure of a service instance, in a service chain of services that perform at least services A and B, using service instance AA and service instances BA and BB to perform the services A and B, respectively, includes the service instance BA receiving from the service instance AA a first packet in a stream for a subscriber, wherein the first packet includes an added header which includes a stream affinity code that is consistent for packets in the stream. The method also includes service instance BA, in a primary role specified in a service map distributed to service instances, processing the first packet by performing service B, and service instance BA identifying service instance BB as having a secondary role for packets carrying the stream affinity code, which is specified in the service map distributed to service instances, and synchronizing service instance BA state information with the service instance BB after processing the first packet. The disclosed method further includes, after failure of the service instance BA, service instance AA receiving an updated service map, and preparing to forward a second packet, which includes the same stream affinity code as the first packet, to service instance BA for performance of the service B, including determining from the updated service map that service instance BA is no longer available, and determining from the updated service map that the service instance BB has the secondary role. The method additional includes forwarding the second packet to service instance BB instead of service instance BA.

For some implementations, the service chain is a security service chain for a subscriber and at least the service B is a security service. For the disclosed method, the stream affinity code is included in an added header as an added IP header as IP source and destination. Many implementations further include the packet carrying a service chain for a subscriber in an added packet header and service B being among services specified in the service chain.

For some implementations of the disclosed method, instances of service A and service B run in containers and the containers are hosted in pods. In many cases, instances of service A and service B are implemented on virtual machines, bare metal servers or custom hardware. For the disclosed method, the failure of service instance BA is detected by a monitoring agent, including monitoring service instance BA, for packet processing activity, and causing updating of the service map for service B to remove the service instance BA from availability should it be inactive for a configurable predetermined amount of time. In one example, the configurable predetermined amount of time may be 15 seconds. In another case, 30 seconds of inactivity may cause the service instance to be considered "failed".

Some implementations of the disclosed method further include service instance BB processing the second packet and based on the processing, identifying a next service, among at least two additional services to which the subscriber has subscribed, that should next handle the packet, and routing the processed second packet to the identified next service upon egress from service instance BB.

Many implementations of the disclosed method further include processing a plurality of packets in a stream through the service chain of services and directing the packets for processing, as a document, to a cloud access security broker (CASB) that controls exfiltration of sensitive content in documents stored on cloud-based services in use by users of an organization, by monitoring manipulation of the documents.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of distributed routing and load balancing in a dynamic service chain, including:
    receiving a packet for a subscriber at a first service instance, wherein the packet includes a header added after transmittal by the subscriber, which added header includes a stream affinity code that is consistent for packets in a stream;

processing the packet at the first service instance, wherein the first service instance performs a first service in a service chain;

based on the processing, the first service instance determining a second service, among at least second and third services to which the subscriber has subscribed, that should next handle the packet;

the first service instance accessing a flow table using the stream affinity code to select a second service instance, from among a plurality of service instances performing the second service, which performs the second service in the service chain; and the first service instance routing the packet to the selected second service instance upon egress from the first service instance.

2. The method of claim 1, wherein the stream affinity code is included in the added header as IP source and IP destination.

3. The method of claim 2, further including the first service instance routing the packet to the selected second service instance by updating the added header with the IP destination of the selected second service instance.

4. The method of claim 1, further including hashing the stream affinity code to access the flow table.

5. The method of claim 1, wherein the flow table lacks an entry for the second service corresponding to the stream affinity code in the added header, further including:

accessing a consistent hash table (abbreviated CHT) of service instances performing the second service;

selecting an available instance using a six-tuple hash as a key to the CHT to select the second service instance; and updating the flow table to specify the second service instance as providing the second service for packets sharing the header.

6. The method of claim 5, further including selecting an alternate second service instance from the CHT and updating the flow table to specify the alternate second service instance.

7. The method of claim 5, further including a network service header (abbreviated NSH) in the added header, which includes a client ID, and wherein the six-tuple hash is generated using the client ID and using source IP, source port, destination IP, destination port and IP protocol number for the packet.

8. The method of claim 1, wherein the service chain is a security service chain and at least the second and third services are security services.

9. The method of claim 1, wherein instances of the first, second and third services run in containers and the containers are hosted in pods.

10. The method of claim 1, wherein instances of the first, second and third services are implemented on virtual machines, bare metal servers or custom hardware.

11. The method of claim 1, wherein:

the packet further includes an added UDP header, which includes UDP source and/or destination ports, wherein the UDP source and/or destination ports are random or pseudo random values that are consistent for packets in a stream;

further including:

determining a core, from multiple cores running the second service instance, using the UDP source and/or destination values; and forwarding the received packet to the determined core and applying the second service to the packet.

12. The method of claim 11, further including hashing values of the UDP source and/or destination ports to a hash key and using the hash key when determining the core.

13. A tangible non-transitory computer readable storage media, including program instructions loaded into memory that, when executed on processors cause the processors to implement a method of load balancing in a dynamic service chain, the method including:

receiving a packet for a subscriber at a first service instance, wherein the packet includes a header added after transmittal by the subscriber, which added header includes a stream affinity code that is consistent for packets in a stream;

processing the packet at the first service instance, wherein the first service instance performs a first service in a service chain;

based on the processing, the first service instance determining a second service, among at least second and third services to which the subscriber has subscribed, that should next handle the packet;

the first service instance accessing a flow table using the stream affinity code to select a second service instance, from among a plurality of service instances performing the second service, which performs the second service in the service chain; and the first service instance routing the packet to the selected second service instance upon egress from the first service instance.

14. The tangible non-transitory computer readable storage media of claim 13, wherein the stream affinity code is included in the added header as IP source and IP destination and further including hashing the stream affinity code to access the flow table.

15. The tangible non-transitory computer readable storage media of claim 13, wherein instances of the first, second and third services run in containers and containers are hosted in pods, and instances of service A and the service B are implemented on virtual machines, bare metal servers or custom hardware.

16. A system for distributed routing and load balancing in a dynamic service chain, the system including a processor, memory coupled to the processor and computer instructions from the non-transitory computer readable storage media of claim 13 loaded into the memory.

17. The system of claim 16, wherein instances of the first, second and third services run in containers, the containers are hosted in pods, and first and second service nodes are hardware adapted to support the pods.

18. The system of claim 16, wherein instances of the first, second and third services include copies of a first code that implements multiple services.

19. The system of claim 16, wherein the flow table lacks an entry for the second service corresponding to the stream affinity code in the added header, further including:

accessing a consistent hash table (abbreviated CHT) of service instances performing the second service;

selecting an available instance using a six-tuple hash as a key to the CHT to select the second service instance; and updating the flow table to specify the second service instance as providing the second service for packets sharing the header.

20. The system of claim 16, further including the packet carrying a service chain in a packet header and the second and third services being among services specified in the service chain.

* * * * *